(12) United States Patent
Sekhar et al.

(10) Patent No.: US 7,840,790 B1
(45) Date of Patent: Nov. 23, 2010

(54) METHOD AND SYSTEM FOR PROVIDING DEVICE DRIVERS IN A VIRTUALIZATION SYSTEM

(75) Inventors: Vishnu Mohan Sekhar, Palo Alto, CA (US); Greg Hutchins, Palo Alto, CA (US); Shaw Cheng Chuang, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 881 days.

(21) Appl. No.: 11/676,111

(22) Filed: Feb. 16, 2007

(51) Int. Cl.
*G06F 15/177* (2006.01)
(52) U.S. Cl. ................................. 713/1; 713/2; 713/100
(58) Field of Classification Search ............... 713/1, 713/2, 100
See application file for complete search history.

(56) References Cited

U.S. PATENT DOCUMENTS

| | | | |
|---|---|---|---|
| 6,397,242 B1 | 5/2002 | Devine et al. | |
| 6,496,847 B1 | 12/2002 | Bugnion et al. | |
| 6,961,941 B1 | 11/2005 | Nelson et al. | |
| 7,552,279 B1 * | 6/2009 | Gandler | 711/114 |
| 2005/0235132 A1 * | 10/2005 | Karr et al. | 711/203 |
| 2008/0184273 A1 * | 7/2008 | Sekar | 719/319 |

* cited by examiner

*Primary Examiner*—Nitin C Patel

(57) ABSTRACT

In a virtualization computer system, a method and system that does not exclusively allocate I/O devices, for example, storage and networking devices, to a commodity operating system (COS) when mainly used for booting the virtualization system. Those I/O devices needed by the COS are accessed via virtual machine kernel drivers, thereby giving the COS the benefits of operation derived from features in the virtual machine kernel that is provided for these I/O devices.

37 Claims, 6 Drawing Sheets

METHOD AND SYSTEM FOR PROVIDING DEVICE DRIVERS IN A VIRTUALIZATION SYSTEM

RELATED APPLICATIONS

Field of the Invention

The present invention relates to providing device drivers to a commodity operating system (COS) in a virtual machine architecture, the device drivers and corresponding devices initially used for booting the system, and to providing access to those I/O devices needed by the COS.

BACKGROUND OF THE INVENTION

The advantages of virtual machine technology have become widely recognized. Among these advantages is the ability to run multiple virtual machines on a single host platform. This ability makes better use of the capacity of the hardware while still ensuring that each user enjoys the features of a "complete" computer.

Generally, a virtualization system includes an operating system, which is referred to as a commodity operating system or console operating system (COS), and a virtualization kernel that acts as a second operating system. The COS is used to initially boot the system. After booting, the virtualization kernel is loaded and displaces the COS from the system level. As a result, the virtualization kernel itself directly accesses the physical resources of the computer. All requests by virtual machines, for use of system resources such as I/O devices, then pass via the virtualization kernel. System resources are divided into those that are controlled exclusively by the kernel, those that the kernel allows the COS to handle exclusively, and those for which control is shared by the kernel and the COS.

The division of the system resources results in there being two sets of drivers on the system—one set for the COS and one for the virtualization kernel. Inefficiencies arise related to having to maintain two sets of drivers and contribute to shortcomings in known virtualization environments.

SUMMARY OF THE INVENTION

The present invention, in one embodiment, eliminates the need for I/O devices, for example, storage and networking devices, to be exclusively allocated to the COS when mainly used for booting the virtualization system. The present invention provides a method to access those I/O devices needed by the COS via the virtual machine kernel and the virtual machine kernel drivers, thereby providing improvements to the boot procedure and giving the COS the benefits of operation derived from features in the virtual machine kernel that is provided for these I/O devices.

In one embodiment, in a computer system comprising a hardware processor and a storage device coupled thereto, a method comprises: booting up the hardware processor with a first operating system (OS) installed to run at a first system level; loading a virtualization kernel (vmkernel) and an associated vmkernel storage device driver; the vmkernel storage device driver detecting the storage device; the vmkernel storage device driver identifying the storage device to the first OS; the first OS accessing the storage device, via the vmkernel storage device driver, and retrieving a virtualization environment; and loading the virtualization environment.

In another embodiment, a plurality of I/O devices is coupled to the computer system, wherein access to any I/O device of the plurality of I/O devices, by the first OS, is only via the vmkernel and an associated vmkernel I/O device driver.

In yet another embodiment, in a computer system comprising at least one hardware processor, a method comprises: booting up the hardware processor and initializing with a first operating system (COS) installed to run on the hardware processor at a most-privileged system level, the most-privileged system level being defined as an operational state with permission to directly access predetermined I/O resources of the computer system; mounting a first filesystem; loading a virtual device module (vmkdev), the vmkdev module in communication with the COS; loading a virtualization kernel (vmkernel) and a vmkernel storage device driver, and the vmkernel storage device driver detecting at least one vmkernel storage device; the vmkernel storage device driver identifying the at least one detected vmkernel storage device to the vmkdev module; the vmkdev module presenting the detected vmkernel storage device to the COS; and the COS accessing the detected storage device via the vmkernel, wherein all access to the at least one vmkernel storage device by the COS is via the vmkernel.

In one embodiment, in a computer system comprising a hardware processor and a storage device coupled thereto, a method comprises: booting up the hardware processor with a first operating system (COS) installed to run at a most-privileged system level, the most-privileged system level being defined as an operational state with permission to directly access one or more I/O devices of the computer system; mounting a first filesystem; loading a virtualization kernel (vmkernel) and a vmkernel storage device driver from the first filesystem; the vmkernel storage device driver detecting the storage device; the vmkernel storage device driver identifying the storage device to the COS; and the COS accessing the storage device via the vmkernel storage device driver and loading a virtualization environment.

In one embodiment. the COS is displaced from the most-privileged system level; and the vmkernel is placed at the most-privileged system level, wherein all requests for access to the storage device pass through the vmkernel.

BRIEF DESCRIPTION OF THE DRAWINGS

The above and further advantages of the invention may be better understood by referring to the following description in conjunction with the accompanying drawings in which.

DETAILED DESCRIPTION

Figure 1A:
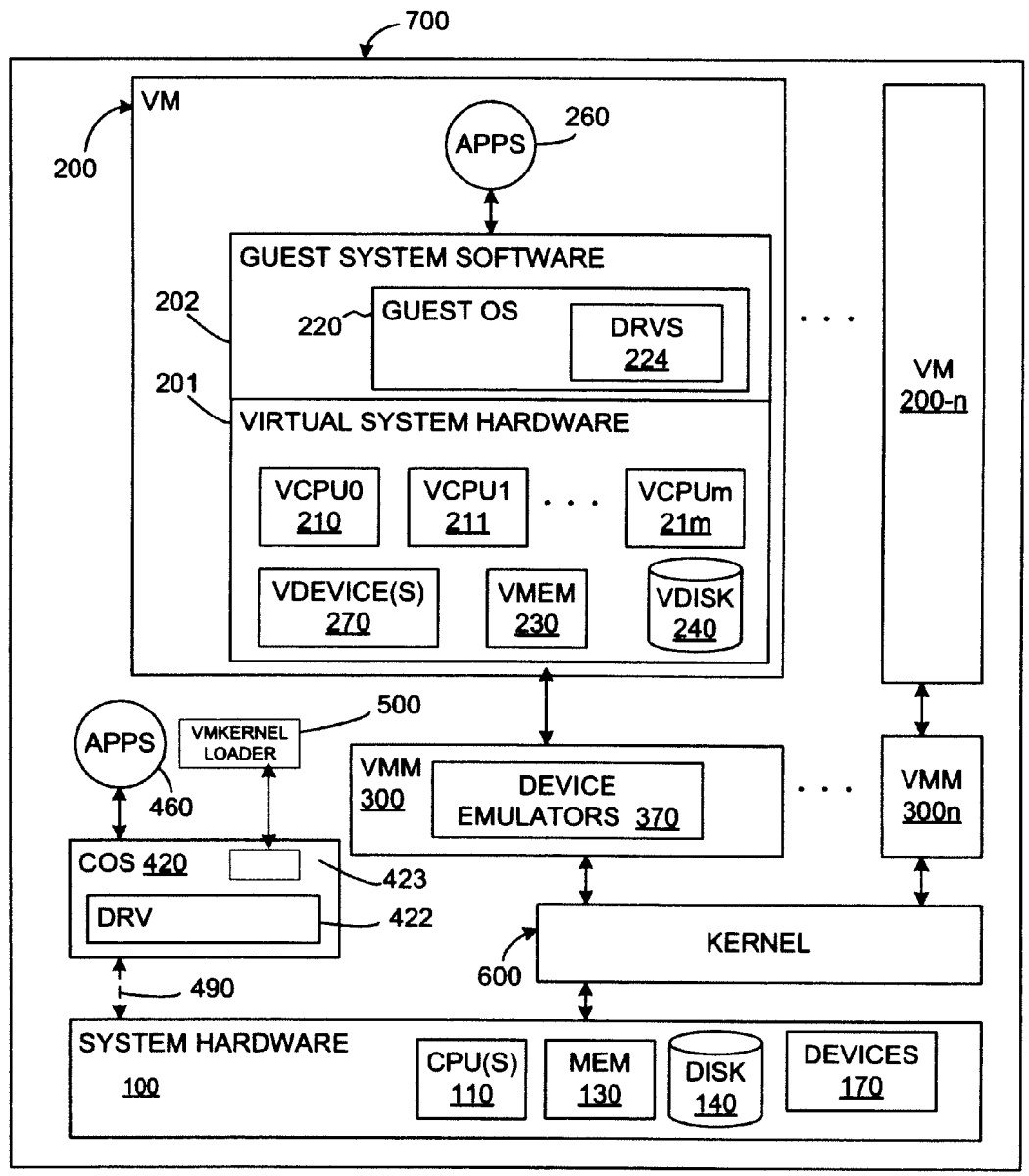
FIG. 1A is a block diagram of a computer system that implements Non-Hosted virtualization.

The invention is herein described, by way of example only, with reference to the accompanying drawings. It is stressed that the particulars shown are by way of example and for purposes of illustrative discussion of the various embodiments of the present invention only, and are presented in the cause of providing, what is believed to be, the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for the sake of clarity, described in the context of separate embodiments, may also be provided in combination in a single embodiment. Conversely, various features of the invention, that are described in the context of a single embodiment, may also be provided separately or in any suitable subcombination.

Embodiments of the present invention may be implemented in a variety of virtual computer systems, based on a variety of different physical computer systems. An embodiment of the invention is described in connection with a specific virtual computer system simply as an example of implementing the invention. The scope of the invention should not be limited to, or by, the exemplary implementation.

The present invention, in one embodiment as will be discussed below in more detail, eliminates the need for I/O devices, for example, storage and networking devices, to be exclusively allocated to the COS when mainly used for booting the virtualization system. The present invention provides a method to access those devices needed by the COS via the virtual machine kernel drivers, thereby providing improvements to the boot procedure and giving the COS the benefits of operation derived from features in the virtual machine kernel that is provided for these I/O devices.

As is well known in the field of computer science, a virtual machine (VM) is a software abstraction—a "virtualization"—of an actual physical computer system. One possible arrangement of a computer system 700 that implements virtualization is shown in FIG. 1A. A VM 200 or "guest," is installed on a "host platform," or simply "host," that includes system hardware 100, that is, a hardware platform, and one or more layers of co-resident components comprising system-level software, such as an operating system (OS), or similar software layer, responsible for coordinating and mediating access to hardware resources. The ESX family of products available from Vmware, Inc. of Palo Alto, Calif. is an example of such virtualization technology.

As software, the code defining the VM will ultimately execute on the actual system hardware 100. As in almost all computers, this hardware will include one or more CPUs 110, some form of memory 130 (volatile or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware processors have also been developed to include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk 240 or similar virtualized mass storage device, and one or more virtual devices 270. Note that a disk—virtual 240 or physical 140—is also a "device," but is usually considered separately because of the important role it plays. All of the virtual hardware components of the VM may be implemented in software to emulate corresponding physical components. The guest system software includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from multiple vendors. Essentially, an SMP system is a hardware platform that connects multiple processors to a shared main memory and shared I/O devices. Yet another configuration is found in a so-called "multi-core" architecture, in which more than one physical CPU is fabricated on a single chip, with its own set of functional units (such as a floating-point unit and an arithmetic/logic unit or ALU), and which can execute threads independently. Multi-core processors typically share only very limited resources, such as cache. Still another technique that provides for simultaneous execution of multiple threads is referred to as "simultaneous multi-threading," in which more than one logical CPU (hardware thread) operate simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 1A illustrates multiple virtual processors 210, 211, . . . , 21$m$ (VCPU0, VCPU1, . . . , VCPUm) within the VM 200. Each virtualized processor in a VM may also be multi-core, or multi-threaded, or both, depending on the virtualization.

If the VM 200 is properly designed, applications 260 running on the VM will function essentially as they would if run on a "real" computer, even though the applications are running at least partially indirectly, that is, via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—which may be referred to generally as "virtualization software" or "virtualization layer"—may include one or more software components and/or layers, possibly including one or more of the software components known in the field of virtual machine technology as "virtual machine monitors" (VMMs), "hypervisors," or virtualization "kernels."

Virtualization terminology has evolved over time and has not yet become fully standardized and these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself. "Hypervisor" is sometimes used, instead, to represent a variant of a VMM alone, which interfaces with some other software layer(s) or component(s) to support the virtualization. Moreover, in some systems, some virtualization code is included in at least one "superior" VM to facilitate the operations of other VMs. Finally, specific software support for VMs is sometimes included in a host OS itself.

Unless otherwise indicated, various embodiments of the present invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration.

Figure 1B:
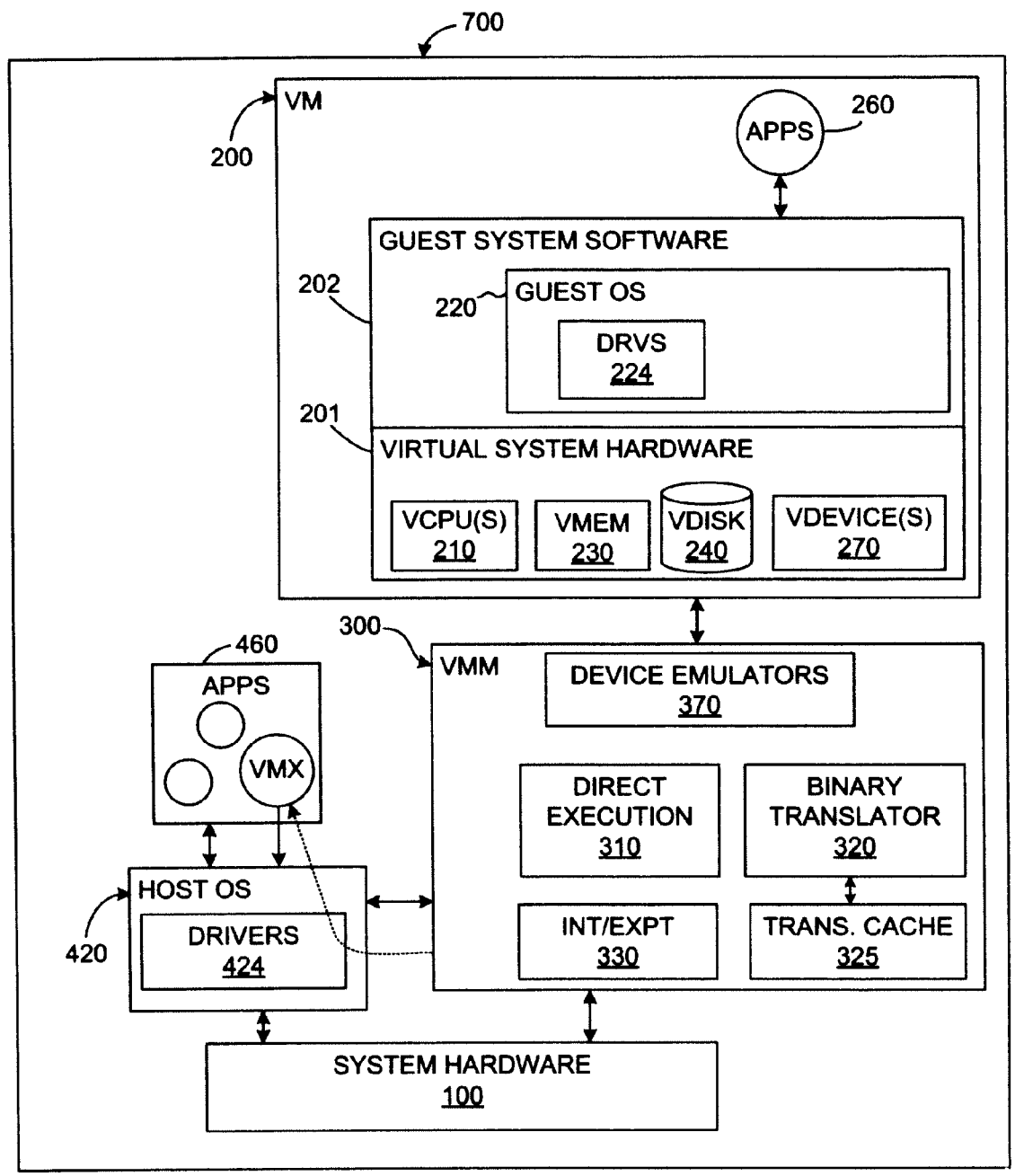
FIG. 1B is a block diagram of a computer system that implements Hosted virtualization.

By way of illustration and example only, FIGS. 1A and 1B show each VM running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 1A illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, that facilitate, for example, migration of a VM from one hardware platform to another.

Two arrangements of intermediate system-level software layer(s) are in general use as, or as part of, the virtualization software—a "hosted" configuration (illustrated in FIG. 1B); and a non-hosted configuration (illustrated in FIG. 1A). In a hosted virtualized computer system, an existing, general-purpose operating system forms a "host" OS that is used to perform certain input/output (I/O) operations, alongside and sometimes at the request and direction of a virtualization software component such as the VMM 300. The host OS 420 usually includes drivers 424 and supports applications 460 of its own, and the VMM (or similar component) are both able to directly access at least some of the same hardware resources, with conflicts being avoided by a context-switching mechanism. The Workstation product of VMware, Inc., of Palo Alto, Calif., is an example of a hosted, virtualized computer system, and some of its operation is explained in U.S. Pat. No. 6,496,847, issued 17 Dec. 2002, to Bugnion, et al. for "System and Method for Virtualizing Computer Systems," the entire contents of which is hereby incorporated by reference.

In addition to device emulators 370, FIG. 1B also illustrates some of the other components that are also often included in the VMM 300 of a virtualization system; many of these components are found in the VMM of a non-hosted system as well. Exception handlers 330 may be included to help context-switching and a direct execution engine 310 and a binary translator 320, often with an associated translation cache 325, may be included to provide execution speed while still preventing the VM from directly executing certain privileged instructions in systems that do not otherwise provide such protection. U.S. Pat. No. 6,397,242, issued 28 May 2002 to Devine, et al., for "Virtualization System Including a Virtual Machine Monitor for a Computer with a Segmented Architecture," the entire contents of which is hereby incorporated by reference, discusses some of these functions.

In many cases, it may be beneficial to deploy VMMs on top of a software layer—a virtualization kernel (vmkernel) 600—constructed specifically to provide efficient support for the VMs. This configuration is frequently referred to as being "non-hosted," as shown in FIG. 1A. Compared with a system in which VMMs (or other software components or layers with similar functionality) run directly on the hardware platform (such as shown in FIG. 1B), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs.

The OS in FIG. 1A may be of the same type as the host OS in FIG. 1B, which is why they are identically numbered—the main difference is the role they play (or are allowed to play, if any) once the virtualized computer system is loaded and running. One example of a non-hosted, virtualized computer system is described in U.S. Pat. No. 6,961,941, issued 1 Nov. 2005, to Nelson, et al., for "Computer Configuration for Resource Management in Systems Including a Virtual Machine," the entire contents of which is hereby incorporated by reference.

The operating system (OS) is configured to act as an interface between various applications and the system resources. For this reason, the OS 420 is referred to here in places as the "console" or the "console OS" or simply the "COS" 420. In FIG. 1A, this OS is shown as module 420 and may be a commodity OS. In one known system, this OS is Linux, although other known operating systems may be used either with no modifications at all, or with some modifications. The OS 420 also includes any necessary drivers 422, one of which is a vmnixmod module 423.

As in other systems, applications may be installed for running on the operating system. Within the VM 200, for example, the application 260 is installed on the OS 220. One application is installed on the OS 420, namely, a vmkernel loader 500. The function of the vmkernel loader 500 is explained below.

In conventional computer architectures, the operating system is at system level. As shown in FIG. 1A, the OS 420 is not; as the kernel 600 is interposed between the OS 420 and the hardware platform once the virtualization system is up and running. Thus, the vmkernel 600 may be viewed either as displacing the OS 420 from the system level and taking this place itself, or as residing at a "sub-system level." When the vmkernel 600 is interposed between the OS 420 and the hardware 100, the OS 420 has access to system resources only when allowed by the vmkernel 600. The vmkernel 600 schedules the OS 420 as if it were any other component, e.g., a VM 200-N, that needs to use system resources.

The implications and uses of this relationship between the vmkernel 600 and the COS 420 are discussed below. Note that the arrangement shown in FIG. 1A is the result of the loading of the vmkernel 600, after which the kernel runs on the native hardware and manages system resources such as those relating to network access and control, CPU time, SCSI ("Small Computer System Interface"—a parallel interface for attaching peripheral devices to computers), etc. At boot-up time, however, the COS 420 may be at system level and the vmkernel 600 may not yet even be operational within the system.

Known Virtualization Kernel Installation

As is known, the processor(s) 110 in any computer system fetch and execute instructions sequentially. A register or memory position is therefore included to serve as an instruction pointer, which indicates the address of the next instruction to be fetched and executed. Moreover, in architectures such as the common Intel x86, the processor will include a number of segment registers that enable the processor to properly address memory, which is segmented into units such as pages. To further direct the operation of the processor, the operating system loads these segment registers with values stored in various descriptor tables. Architectures other than the x86 have similar structures, to the extent they are needed at all.

Whenever the processor encounters an error (such as an attempt to address memory outside of some permissible range or a violation of some privilege requirement), or completes some requested task, it typically generates a fault or interrupt signal that the operating system senses and handles in any predetermined manner. Whichever software component contains, sets, loads or otherwise controls the processor(s)' instruction pointer(s), segment registers or analogous structures, and that intercepts and handles faults and other interrupts, has effective control of the entire processing procedure and can exclude other software components, which don't have such capabilities, from directly accessing the hardware 100.

As its name implies, the vmkernel loader 500 is a software module whose function is to load something else, in this case, the entire virtualization kernel 600. When the vmkernel loader 500 is called, it loads the vmkernel 600 into memory in such a way that the kernel is located at the system level. The vmkernel loader 500 does this by setting a hardware instruction pointer, loading the various segment registers (or equivalents), and setting the forwarding of interrupts and faults to point into (that is, to have addresses within the address space controlled by) the vmkernel 600.

In FIG. 1A, the vmkernel loader 500 is shown as being external to the COS 420, thus, at an application level. This is not necessary as the vmkernel loader 500 may be implemented at system level, i.e., within the COS 420.

As a preparatory step, the vmnixmod module 423 will be installed as any other driver 422 within the COS 420 and the vmkernel loader 500 will be accessible for installation/loading, for example, by being stored as any other application, e.g., on a disk 140. As a first step, at power up (or after returning from some other inactive, non-booted state) the system is initialized using the COS 420 to run its boot-up routine as it would on any conventional system. Thus, at the time of boot-up, the COS 420 is at system level and is communicating directly with the underlying hardware platform 100.

The vmkernel loader 500, then issues a call from within the COS 420 to the vmnixmod module 423, which then loads the vmkernel 600 at system level as described above, thereby substantially displacing the COS 420 itself to essentially the same level as the VMMs 300, . . . , 300*n*. After completing loading of the vmkernel 600, the vmkernel loader 500 then ends with a call to a starting execution point of the kernel itself.

In the known virtualization systems, at boot-up, the COS 420 performs its normal functions as an operating system.

After loading and launching of the vmkernel 600, however, the kernel itself becomes the primary operating system of the overall architecture, whereas the COS 420 becomes a secondary, auxiliary operating system that the vmkernel 600 can invoke to handle certain tasks.

One other function of the vmnixmod module 423 is to act as the software interface between applications 460 running on the COS 420 to communicate with the vmkernel 600. The vmnixmod module 423 may be designed using the same well-known techniques that are used to design conventional drivers loaded within operating systems.

As described above, in known systems, loading of the virtualization kernel results in the COS 420 having to go "through" the vmkernel 600, to access system resources managed by the vmkernel 600 and gain access only if the vmkernel 600 allows it. A resource scheduling module or manager 608 within the vmkernel 600 allocates system resources, including CPU time and disk access, not only among VMM/VM pairs, but also among these pairs, the COS and any other installed or loaded applications.

In known systems, the COS 420 will already have been configured, for example, via pre-installed, commodity drivers, for performing certain "non-reserved" or "shared" tasks, such as sensing and/or controlling certain devices like a mouse, trackball, or other input device, floppy disk drives, a display monitor, etc.

Figure 2:
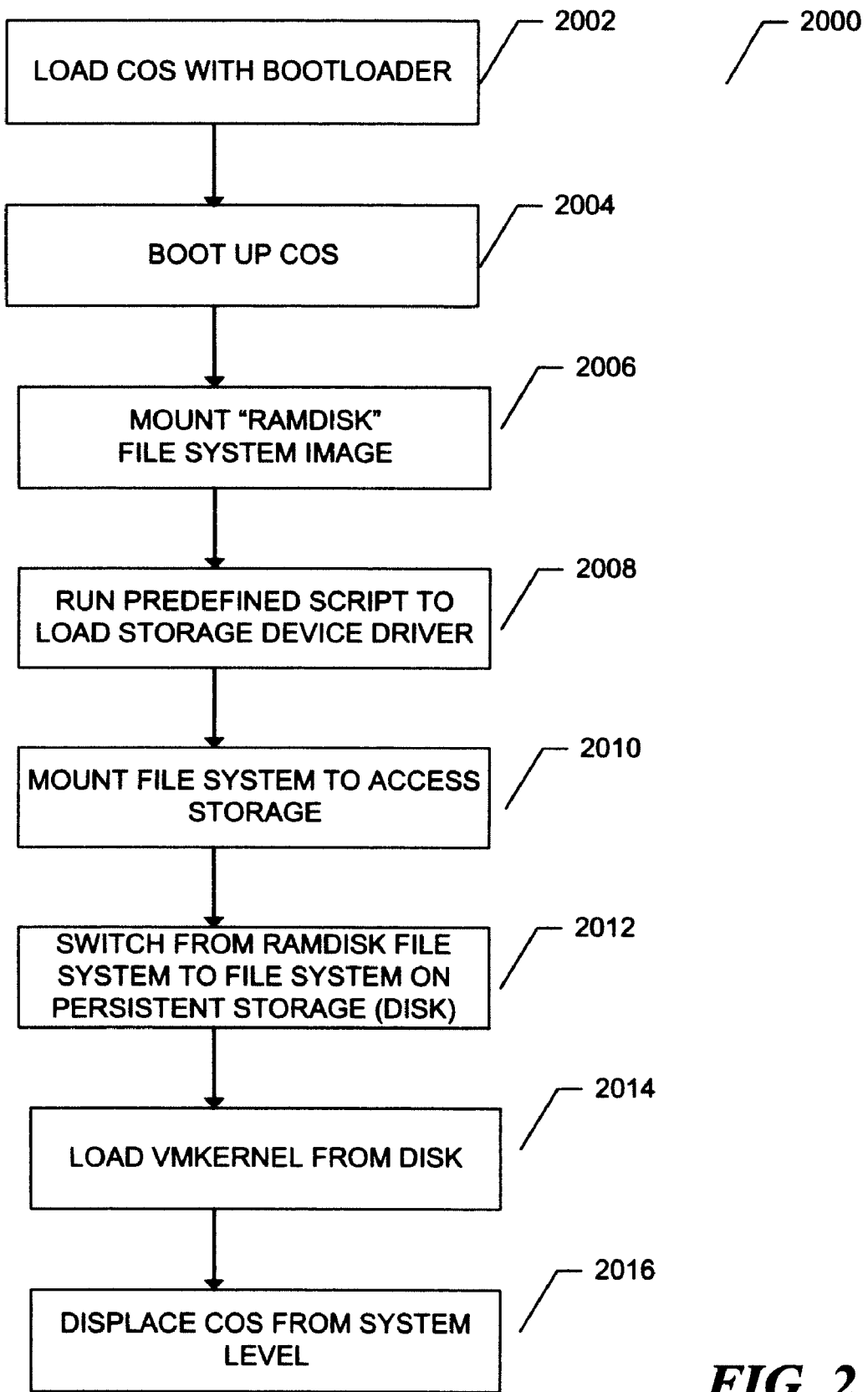
FIG. 2 is flowchart of an initialization process for a known virtualization computer system.

The "displacement" of the COS from the system level is not total as the COS retains direct communication with some hardware. This will be explained in more detail with respect to the process for booting up, i.e., initiating, a virtualization system as found in, for example, the ESX product from VMware, Inc., with respect to FIGS. 2 and 3.

The ESX architecture includes the first operating system (COS) 420, which may be a commodity operating system (sometimes also referred to as the console operating system) and the virtualization kernel 600 which acts as a second operating system (vmkernel). The COS is used to boot the system as a whole, and at least one storage controller 502-C is allocated to the COS. The storage controller 502-C is the one attached to the disk on which ESX product or system software has been installed. This controller allows the COS to complete the boot process and access a disk 140 so as to load the vmkernel 600.

A booting process 2000 consists of a bootloader, as is commonly known, found in the master boot record, loading, steps 2002, 2004, the COS, and loading an in-memory filesystem called the "ramdisk," that contains at least one device driver for the storage controller 502-C allocated to the COS. The COS mounts this filesystem image, step 2006, and runs a predefined script in the image, step 2008, that loads the storage device driver 3002 for the COS. Once the device driver 3002 is loaded, the COS can access storage 140 with a persistent filesystem. This persistent file system is then mounted, step 2010, and the COS switches, step 2012, from the ramdisk filesystem to the persistent filesystem on a storage device. The COS loads the vmkernel 600 from the disk file system, step 2014. Once the vmkernel is loaded, it displaces the COS from the system level, and, as a result, the vmkernel itself directly accesses predetermined physical resources of the computer.

I/O Controller Allocation and Access

In known systems, physical resources, mainly I/O controllers for storage and networking devices, are divided between the COS 420 and the vmkernel 600 by specifying a list of PCI bus, slot, and function numbers at the boot command line for the COS. As a result, there are two sets of drivers on the system—one set, 3002, 3004, for the COS and one set 3006, 3008 for the vmkernel. The appropriate driver is loaded based on which of the two has been allocated the device. There also exists the concept of a "shared storage device" where a physical device assigned to the COS (and controlled by its device driver) is transferred to the vmkernel at run-time by taking over the COS device driver's functions, and reinitializing the device using a vmkernel device driver.

With respect to shared storage devices, the vmnixmod module 423 is loaded into the COS 420. When the vmkernel device driver is loaded for a device that is currently owned by the COS, the vmnixmod module 423 takes control of the device and redirects the COS I/O to pass through itself and to the vmkernel device driver 3006, 3008. Any device driver in the COS for that device is effectively disabled.

Figure 3:
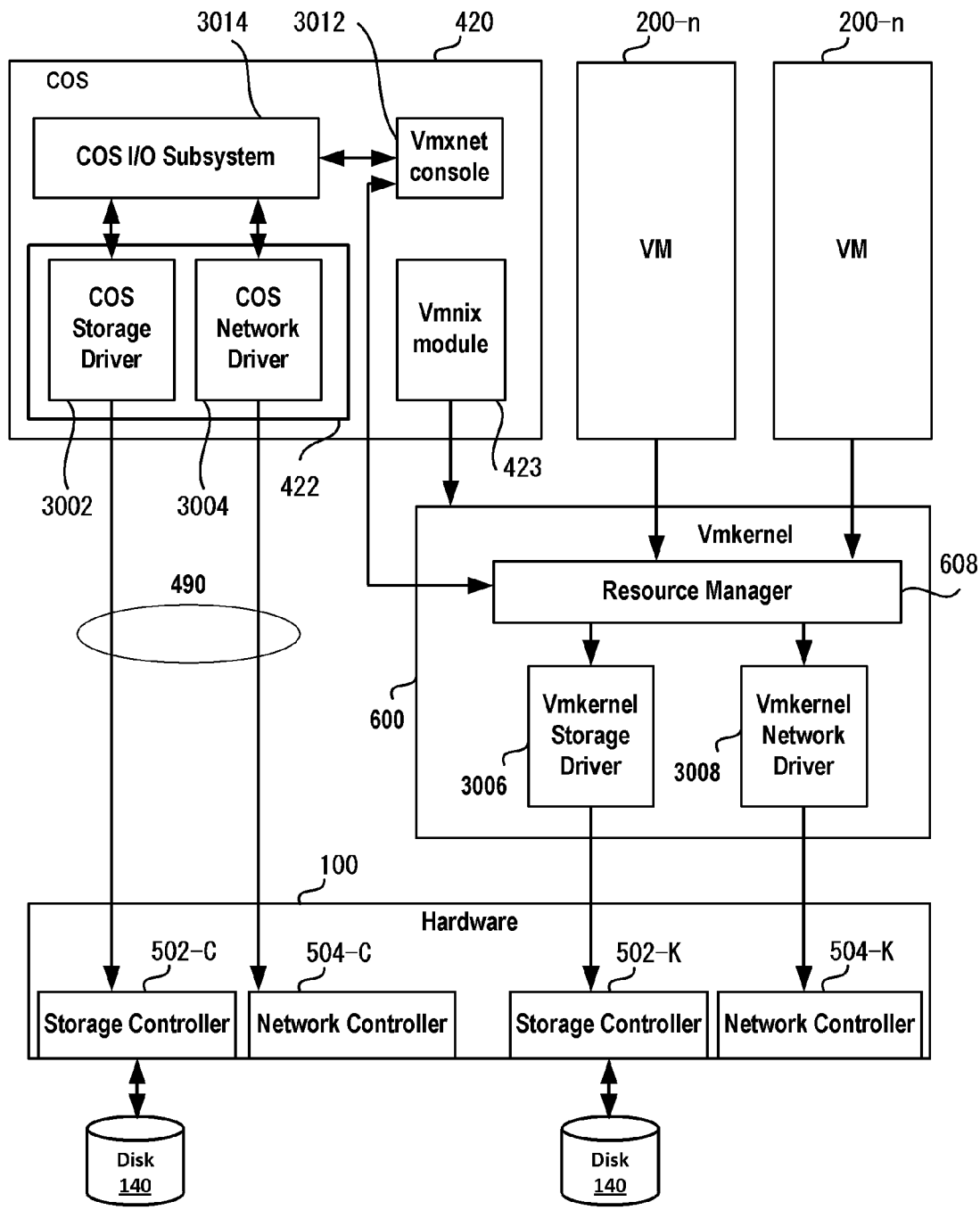
FIG. 3 is a block diagram of a known computer system that implements virtualization.

A vmxnet_console module 3012 is loaded into the COS and presents a "virtual" network interface into the COS. This virtual interface is connected to a real networking device under the control of the vmkernel 600. Network packets can then be passed from the COS, through the vmxnet_console module 3012, and into the vmkernel 600 to the real network I/O device. Applications that communicate with devices controlled by, or accessible through, the COS 420 do so via a COS I/O subsystem 3014 as shown in FIG. 3.

In known methods of booting a virtualization environment, as has been described above, a division of the system resources results in there being two sets of drivers on the system. One set of drivers is provided for the COS 420 and one set of drivers is provided for the virtualization kernel 600. Further, some I/O devices are accessible only by the COS, some I/O devices are accessed only through the virtualization kernel, and other I/O devices are shared by the COS and virtualization kernel. Maintaining two sets of drivers makes the transfer and re-initialization of a running controller more complicated and the COS drivers are not provided with any fault tolerance support. Still further, the efficiencies of a virtualization environment are not fully implemented due to the "remnant" connection of the COS to I/O devices not under the control of the virtualization environment.

Figure 4:
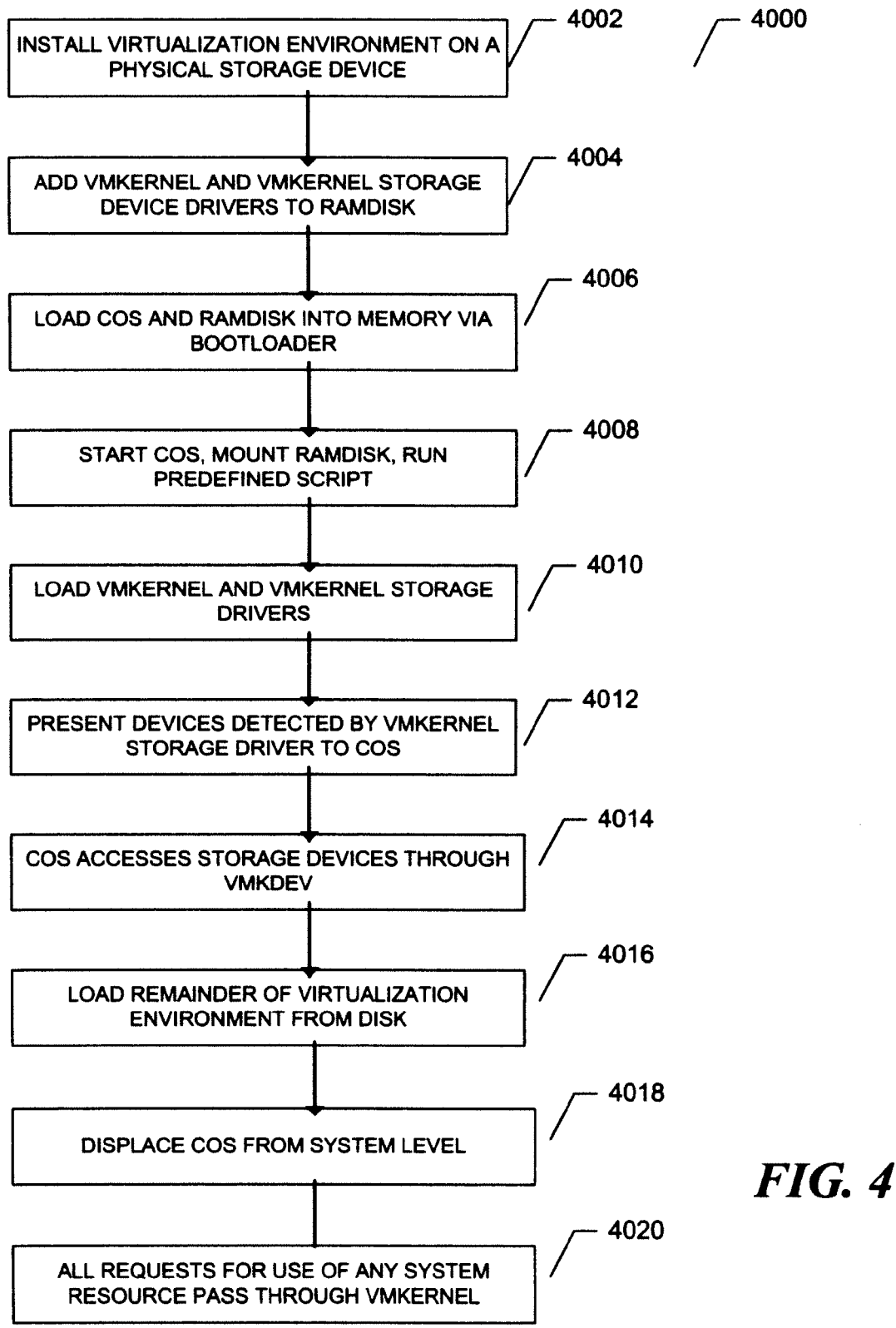
FIG. 4 is a flowchart of an initialization process for a virtualization computer system in accordance with one embodiment of the present invention.

A method for eliminating physical storage and network controller allocation to the COS will now be described with reference to the flowchart of FIG. 4 and the block diagram of FIG. 5.

In one embodiment of the present invention, a virtual device module vmkdev 5002 is provided. The vmkdev module 5002 can be an independent COS module or, as shown in FIG. 5, incorporated as part of the vmnixmod module 423. As will be described in more detail below, when the vmkernel 600 is loaded, and an I/O device driver 3006, 3008, is loaded in the vmkernel 600, the vmkdev module 5002 is notified for every physical controller or device in the hardware 100 that has been detected. The vmkdev module 5002 then registers these devices with the COS 420 using a known COS device driver interface. As a result, the vmkdev module 5002 can then receive I/O requests for these devices, as any other COS device driver would, and then pass them through to the vmkernel 600 for actual I/O through the vmkernel device driver 3006, 3008. The vmkdev module 5002, in effect, operates as a virtual device driver in the COS 420 for the device driver 3006, 3008 in the vmkernel 600. The vmkdev module 5002 operates as a virtual driver interface and I/O requests received from the COS are passed on to the vmkernel 600 for the actual I/O transaction. Advantageously, implementation of the present invention leverages the existing support for shared resources in a virtualization environment.

A process 4000 of booting or initializing a virtualization environment with an implementation of the present invention will now be described. For clarity of explanation of the present invention, the following is presented with reference to an ESX virtualization environment although the present invention is not limited to this one commercial virtualization environment.

Initially, step 4002, a commodity operating system's (COS) installation mechanism is used to install a virtualization environment system's software on a physical storage device, for example disk drive 140. In step 4004, the ramdisk file system is created and the vmkernel 600 and the vmkernel storage device drivers 3006 are added to the ramdisk filesystem.

Subsequently, step 4006, the vmkernel loader 500 loads the COS 420 and the ramdisk into memory. The COS starts up and mounts the ramdisk filesystem and starts the predefined script as described earlier, step 4008. The vmkernel 600 and the vmkernel storage drivers 3006 are loaded, step 4010. In the present invention, as compared to the known method of booting, no COS storage drivers, however, are loaded.

The vmkernel storage drivers 3006 detect the physical storage devices 140 connected to the hardware 100. This information is presented to the vmkdev module 5002 which presents the devices detected by the vmkernel storage driver 3006 to the COS, step 4012.

The COS 420 now has access to the storage devices 140 through vmkdev module 5002, step 4014. The disk 140 on which the rest of the virtualization environment has been installed is presented, and the COS finishes the boot process, by loading the remainder of the virtualization environment from disk, step 4016. As previously described, the COS is displaced from the system level, step 4018, and all requests for any system resources pass through the vmkernel, step 4020.

Figure 5:
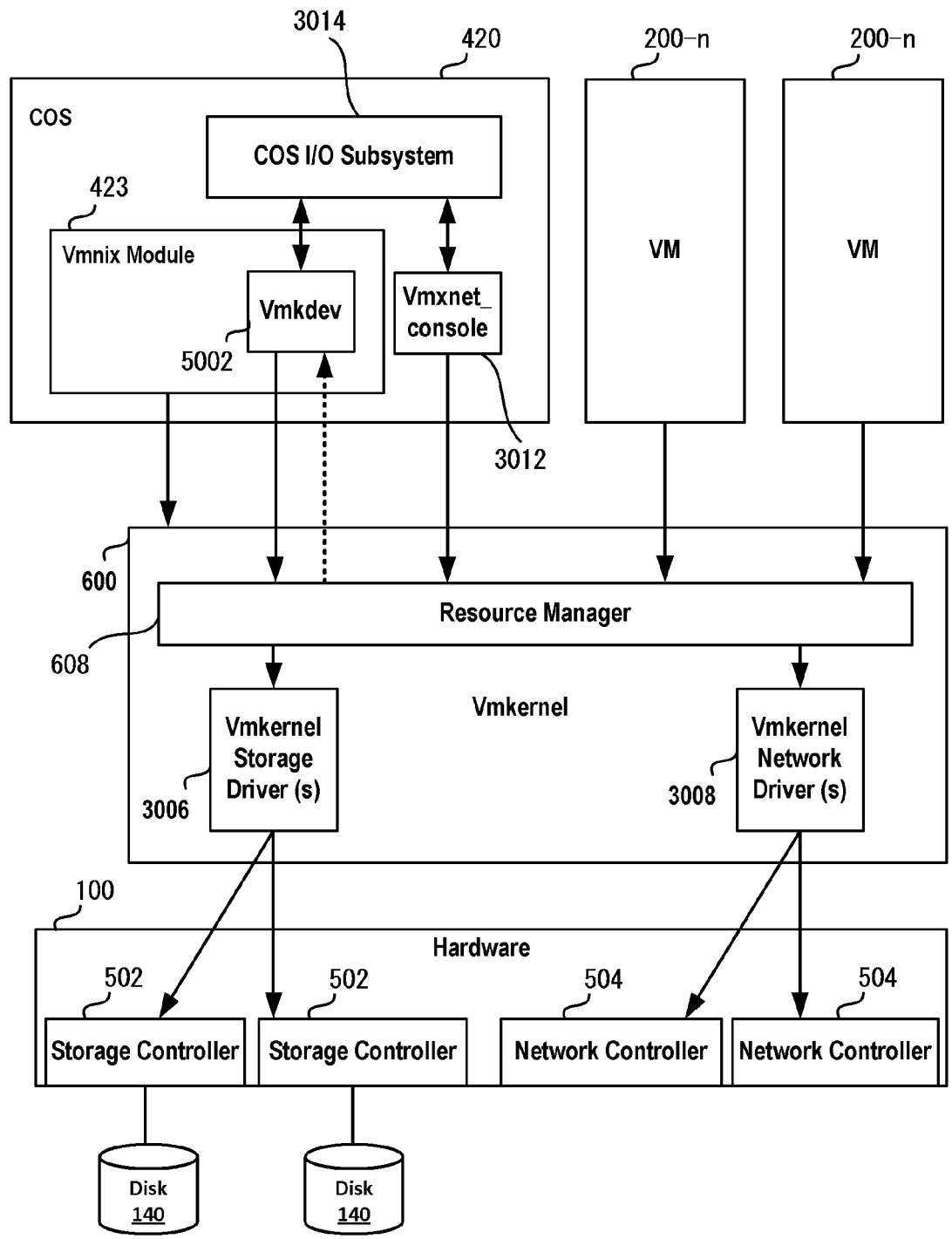
FIG. 5 is a block diagram of a computer system that implements virtualization in accordance with the process shown in FIG. 4.

The resulting system, as shown in FIG. 5, directs all I/O transactions through the vmkernel 600.

In addition, physical network controllers are not assigned to the COS. By using the vmxnet_console module 3012, only the network controller 3008 that is to be used for the COS for network access needs to be identified during install. The virtual network interface exported by the vmxnet_console module 3012 is attached to a vmkernel back-end connected to the actual network controller card.

There are a number of advantages to the booting or initialization of a virtualization environment implemented in accordance with the teachings of the present invention.

A single set of drivers: The virtualization environment no longer needs to maintain two sets of device drivers. Only the vmkernel device drivers for storage and network devices are needed for system operation. As a result, the vmkernel 600 is the single resource manager and access point for all of the I/O devices.

No controller transfer of shared devices: Transfer and re-initialization of a controller in a running system is error-prone and can cause data corruption if mishandled. The operation of a shared device system, as described above with respect to known systems, is rendered unnecessary.

Fault-tolerance for COS: When all of the I/O devices are fully owned and driven by the vmkernel 600, the COS 420 benefits from the failover and multipathing features of the vmkernel 600. For example, I/O transactions may be rerouted through different controllers to the same device when such a setup is available and is needed for effective operation. The advantages of rerouting are difficult to achieve in "shared device" systems and not possible when the COS 420 has single exclusive storage and networking devices.

Management agents: Third-party management and monitoring systems that are written for the COS 420 are able to access vmkernel I/O devices through the vmkdev module because these devices appear in/to the COS system similar to physical devices driven by the device drivers of the COS. This is not possible in known systems as the vmkernel devices are "hidden" from the COS. In prior systems, third party management agents were able to detect and report only on the devices owned exclusively by the COS 420. With the present invention, the features of third-party management can be applied to devices that are managed by the vmkernel 600 but accessible by the COS 420.

It should be appreciated that the present invention is not limited to using disks 140 that are directly connected to the hardware 100. It is envisioned that network-based storage, for example, NAS or SAN, can be implemented. In one embodiment of the present invention, these network storage devices are also "virtualized" to the COS and, for example, an NFS file system can be mounted to act as the "root file system," i.e., the persistent file system, from which the remainder of the virtualization environment can be obtained.

Further, in the context of one embodiment of the present invention, the installation has been described as being done by the COS's regular installer. As is known, an installer follows the same boot procedure as in regular operation, i.e., a non-virtualized system, except that the installer boots off sources other than a hard disk (usually), e.g., a CDROM, a floppy, or over the network. Advantageously, the boot process of the present invention can be applied to the installer also, where the COS boots, the vmkernel is booted, and then the installer program runs on the COS, having access to storage (where it puts its software) via the vmkernel drivers. The installer ramdisk is substituted on the installation media with one that has the vmkernel, loader, etc. Alternatively, the ramdisk may be transferred over the network, for a network-based installation. In either case, the full virtualization environment does not need to be loaded, only the basic environment that provides the COS with virtual access to the I/O devices.

The invention has herein been described, by way of example only, with reference to the accompanying drawings. It is stressed that the particulars shown are by way of example and for purposes of illustrative discussion of the various embodiments of the present invention only, and are presented in the cause of providing, what is believed to be, the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

It is to be understood that the invention is not limited in its application to the details of construction and the arrangement of the components set forth in the description or illustrated in the drawings. The invention is capable of other embodiments or of being practiced or carried out in various ways. Also, it is to be understood that the phraseology and terminology employed herein are for the purpose of description and should not be regarded as limiting.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

The invention may also be implemented directly in a computer's primary OS, both where the OS is designed to support virtual machines and where it is not.

Moreover, the invention may be implemented wholly or partially in hardware, for example in processor architectures intended to provide hardware support for virtual machines.

Unless otherwise indicated, the invention described above may be used in virtualized computer systems having any type or configuration of virtualization software.

What is claimed is:

1. In a computer system comprising a hardware processor and a storage device coupled thereto, the storage device having a virtualization environment, a method comprising:
 booting up the hardware processor with a first operating system (OS) installed to run at a first system level, wherein the first OS is booted without a storage device driver for the first OS;
 loading a virtualization kernel (vmkernel) and an associated vmkernel storage device driver;
 the vmkernel storage device driver detecting the storage device;
 the vmkernel storage device driver identifying the storage device to the first OS, wherein, prior to the identifying, the storage device is inaccessible from the first OS;
 the first OS accessing the storage device, via the vmkernel storage device driver, and retrieving the virtualization environment, wherein the retrieving retrieves remaining parts of the virtualization environment that are not already loaded through the loading of the vmkernel; and
 loading the remaining parts of the virtualization environment.

2. The method of claim 1, further comprising mounting a first filesystem, wherein the first filesystem is pre-loaded with the vmkernel and the vmkernel storage device driver.

3. The method of claim 2, wherein the first file system is in non-persistent storage.

4. The method of claim 1, further comprising coupling a plurality of I/O devices to the computer system, wherein access to any I/O device of the plurality of I/O devices, by the first OS, is only via the vmkernel and an associated vmkernel I/O device driver.

5. The method of claim 4, wherein no I/O device is directly coupled to the first OS.

6. The method of claim 1, further comprising:
displacing the first OS from the first system level; and
placing the vmkernel at the first system level, wherein all requests for access to the storage device pass through the vmkernel.

7. The method of claim 6, wherein the first system level is a most-privileged system level having permission to directly access one or more I/O devices of the computer system.

8. The method of claim 6, wherein the first OS only has access to any I/O devices of the computer system via the vmkernel and an associated vmkernel I/O device driver.

9. The method of claim 1, further comprising pre-installing virtualization environment software on the storage device.

10. In a computer system comprising at least one hardware processor, a method comprising:
booting up the hardware processor and initializing with a first operating system (COS) installed to run on the hardware processor at a most-privileged system level, the most-privileged system level being defined as an operational state with permission to directly access predetermined I/O resources of the computer system;
mounting a first filesystem;
loading a virtual device module (vmkdev), the vmkdev module in communication with the COS;
loading a virtualization kernel (vmkernel) and a vmkernel storage device driver, and the vmkernel storage device driver detecting at least one vmkernel storage device;
the vmkernel storage device driver identifying the at least one detected vmkernel storage device to the vmkdev module;
the vmkdev module presenting the detected vmkernel storage device to the COS; and
the COS accessing the detected storage device via the vmkernel,
wherein all access to the at least one vmkernel storage device by the COS is via the vmkernel.

11. The method of claim 10, further comprising:
displacing the COS from the most-privileged system level; and
placing the vmkernel at the most-privileged system level, wherein all requests for access to a system resource pass through the vmkernel.

12. The method of claim 11, wherein a system resource is chosen from:
a mass storage device;
a network interface; and
a network adapter.

13. The method of claim 10, further comprising:
storing the VM kernel and the vmkernel storage device driver in the first filesystem; and
retrieving the VM kernel and the vmkernel storage device driver from the first filesystem.

14. The method of claim 13, wherein the first filesystem is stored in a memory accessible by the hardware processor.

15. The method of claim 10, wherein no I/O devices are directly accessible by the COS.

16. The method of claim 10, wherein the vmkdev module is independent from the COS.

17. The method of claim 10, wherein I/O devices accessed by the COS, via the vmkernel device drivers, appear to the COS similar to physical devices driven directly by device drivers in the COS.

18. The method of claim 10, further comprising:
retrieving virtualization environment code from the detected storage device; and
loading the virtualization environment code on the computer system.

19. In a computer system comprising a hardware processor and a storage device coupled thereto, the storage device having a virtualization environment, a method comprising:
booting up the hardware processor with a first operating system (COS) installed to run at a most-privileged system level, the most-privileged system level being defined as an operational state with permission to directly access one or more I/O devices of the computer system, wherein the COS is booted without a storage device driver for the COS;
mounting a first filesystem;
loading a virtualization kernel (vmkernel) and a vmkernel storage device driver from the first filesystem;
the vmkernel storage device driver detecting the storage device;
the vmkernel storage device driver identifying the storage device to the COS, wherein, prior to the identifying, the storage device is inaccessible from the COS; and
the COS accessing the storage device via the vmkernel storage device driver and loading remaining parts of the virtualization environment that are not already loaded through the loading of the vmkernel.

20. The method of claim 19, further comprising pre-installing virtualization environment software on the storage device.

21. The method of claim 19, further comprising:
displacing the COS from the most-privileged system level; and
placing the vmkernel at the most-privileged system level, wherein all requests for access to the storage device pass through the vmkernel.

22. The method of claim 19, further comprising coupling a plurality of I/O devices to the computer system, wherein access to any I/O device of the plurality of I/O devices, by the COS, is only via the vmkernel and an associated vmkernel I/O device driver.

23. The method of claim 22, wherein no I/O device is directly coupled to the COS.

24. A method of initiating a virtualization environment in a computer system, the method comprising:
loading a first operating system OS to run at a first system level on the computer system, the first OS is loaded without an I/O device driver for the first OS;
loading a virtualization kernel (vmkernel) and an associated vmkernel I/O device driver, each in communication with the first OS, wherein the vmkernel and the associated vmkernel I/O device driver are parts of the virtualization environment;
the associated vmkernel I/O device driver detecting an I/O device and identifying the detected I/O device to the first OS, wherein prior to the identifying, the I/O device is inaccessible from the first OS;
the first OS accessing the I/O device, via the vmkernel I/O device driver, and retrieving remaining parts of the virtualization environment that are not already loaded through the loading of the vmkernel; and
loading the virtualization environment on the computer system.

25. The method of claim 24, further comprising:
displacing the first as from the first system level; and
placing the vmkernel at the first system level,
wherein all requests for access to the I/O device pass through the vmkernel.

26. The method of claim 24, further comprising:
providing a plurality of I/O devices coupled to the computer system and coupled to the vmkernel;
placing the first as at a second system level different from the first system level; and
placing the vmkernel at the first system level;
wherein the second system level with respect to the first system level is such that all transactions with any of the I/O devices of the plurality of I/O devices from the first OS pass through the vmkernel and an associated vmkernel I/O device driver.

27. The method of claim 24, wherein the associate vmkernel I/O device driver detects the I/O device and identifies the detected I/O device to the first OS.

28. The method of claim 27, wherein the first system level is a most-privileged system level having permission to directly access one or more I/O devices of the computer system.

29. A system for loading a virtualization environment in a computer system comprising a hardware processor and a storage device coupled thereto, the storage device having a virtualization environment, the computer system comprising an initialization program contained in a memory coupled to the hardware processor, wherein the initialization program comprises:
program code for booting up the hardware processor with a first operating system (OS) to run at a first system level, wherein the first OS is booted without a storage device driver for the first OS;
program code for loading a virtualization kernel (vmkernel) and an associated vmkernel storage device driver;
program code for the vmkernel storage device driver to detect the storage device;
program code for the vmkernel storage device driver to identify the storage device to the first OS, wherein prior to the identifying, the storage device is inaccessible from the first OS;
program code for the first OS for accessing the storage device, via the vmkernel storage device driver, and retrieving a virtualization environment, wherein the retrieving retrieves remaining parts of the virtualization environment that are not already loaded through an execution of the program code for loading the vmkernel; and
program code for loading the remaining parts of the virtualization environment.

30. The system of claim 29, further comprising coupling a plurality of I/O devices to the computer system, wherein access to any I/O device of the plurality of I/O devices, by the first OS, is only via the vmkernel and an associated vmkernel I/O device driver.

31. The system of claim 30, wherein no I/O device is directly coupled to the first OS.

32. The system of claim 29, the initialization program further comprising program code for mounting a first filesystem.

33. The system of claim 32, wherein the first file system is in non-persistent storage.

34. The system of claim 33, wherein the non-persistent storage comprises a memory coupled to the hardware processor.

35. The system of claim 29, wherein the initialization program further comprises:
program code for displacing the first OS from the first system level;
program code for placing the vmkernel at the first system level; and
program code for passing all requests for access to the storage device through the vmkernel.

36. The system of claim 35, wherein the first system level is a most-privileged system level having permission to directly access one or more I/O devices of the computer system.

37. The system of claim 35, wherein the first OS only has access to any I/O devices of the computer system via the vmkernel and an associated vmkernel I/O device driver.

* * * * *